April 22, 1947.　　　E. B. McDOWELL ET AL　　　2,419,459
PHOTOELECTRIC DETECTING APPARATUS
Filed Feb. 1, 1944
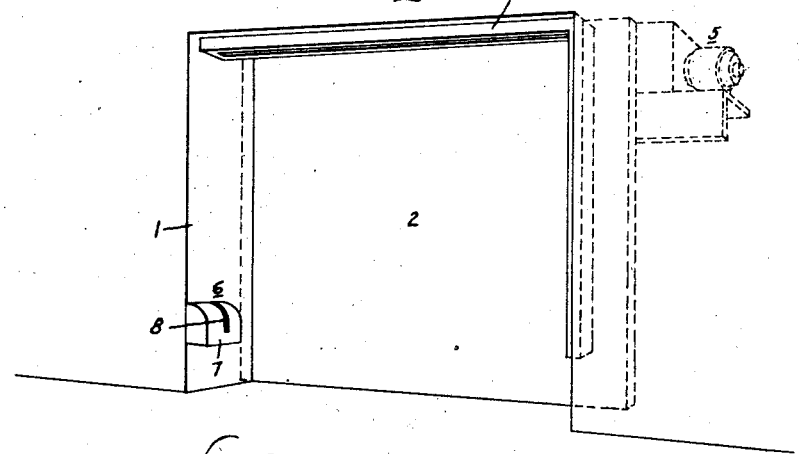
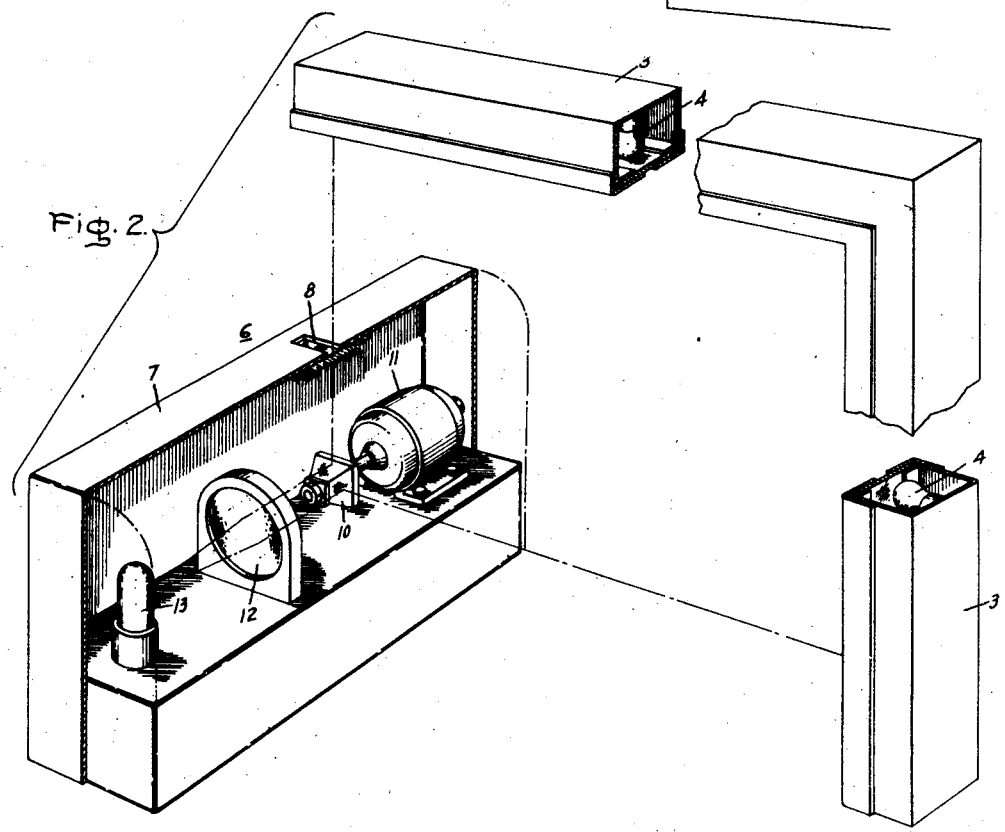
Inventors:
Earle B. McDowell,
Edward M. Gardiner,
by Harry E. Dunham
Their Attorney.

Patented Apr. 22, 1947

2,419,459

UNITED STATES PATENT OFFICE 2,419,459

PHOTOELECTRIC DETECTING APPARATUS

Earle B. McDowell, Scotia, and Edward M. Gardiner, Schenectady, N. Y., assignors to General Electric Company, a corporation of New York Application February 1, 1944, Serial No. 520,618

5 Claims. (Cl. 250—41.5)

Our invention relates to photoelectric detecting apparatus and it has for its object the provision of improved apparatus by which an indication is given in response to the presence of an object within a chosen area. While our invention may have various applications we have chosen to illustrate it as applied to an automobile entrance to a building whereby if any part of an automobile or object carried thereby projects into the area enclosed by an entrance doorway a signal is given or a door which normally closes the entrance is automatically opened.

Our invention will be better understood from the following description taken in connection with the accompanying drawing and its scope will be pointed out in the appended claims.

Referring to the drawing, Figs. 1 and 2 are perspective views of an embodiment of our invention the latter being more detailed and drawn to a smaller scale than the former.

The drawing illustrates by way of example a doorway or entrance to a building, the doorway casing being shown at 1 and the door which cooperates with the inner part thereof at 2. Attached to the top and one side of the door casing adjacent to the outer part thereof is the trough-like lamp holder and reflector member 3. A series of electric lamps 4 are mounted in the member 3 and the open or inner side of the member is closed preferably by a translucent strip such as opal glass whereby the light from the separate lamps is so diffused that from a point near the ground the member appears to be illuminated substantially uniformly throughout its length. Because of its size the door preferably opens by an upward sliding movement and for that purpose it may be provided with some well known form of motor driven operating mechanism indicated at 5.

At or near the ground on that side of the doorway opposite to that having the lamp holder is the light receiving and scanning apparatus 6 mounted within the casing 7 having the light slit 8. The scanning apparatus as shown by Fig. 2 comprises the truncated square pyramid 10 having a mirror on each of its four sides and mounted on the shaft of the motor 11 to rotate on an axis passing through the apex of the pyramid and at right angles to its base. The slope of the faces of the pyramid is such that light from the lamp holder entering the casing 7 through the slit therein is reflected axially. The lens 12 focuses those rays on the photoelectric device 13, the output of which may be employed to give a signal or may operate through suitable well known apparatus electrically connected by known circuits (not shown) to operate the door raising mechanism upon the occurrence of a shadow in the light received by the device 13. Inasmuch as the pyramid 10 has four reflecting faces and the lamp holder extends through a 90° angle about the pyramid it will be seen that as the pyramid rotates light from successive small portions of the lamp holder is reflected into the photoelectric device without interruption since light from one end of the holder begins to reach the device as or preferably just before light from the other end of the holder terminates; hence, the device is constantly illuminated provided of course there is no object in the doorway to obstruct the light. Should an automobile or any small body projecting therefrom move into the doorway where it would obstruct a light beam from any small part of the lamp holder to the rotating mirror a signal will be given by the response of the photoelectric device. By appropriate and well-understood means, the photoelectric device may control the motor 5 to effect the raising of the door. Obviously, the photoelectric device may, if desired, be spaced from all sides of the enclosure and the light source extended to both sides as well as the top thereof, or it may be extended still further so as to completely surround the opening, the slit 8 being extended accordingly.

While our invention has been described and illustrated by way of example as applied to a doorway it is by no means limited to such use since it may have various other uses such as that for providing a protective area in front of a punch press to prevent operation of the press if a person's hands or other part of his body extend into a curtain of light in that area.

What we claim as new and desire to secure by Letters Patent of the United States is:

1. Apparatus for giving an indication of the presence of an object within an area comprising the combination of radiation-emitting means supported in linearly extended position to project a curtain of radiation across said area, a rotating pyramidal mirror which is operative to scan substantially uninterruptedly successive portions of said curtain and to reflect the light received as an axial beam, a radiation-responsive device positioned in light-receiving relation to said scanning mirror and an electrical mechanism operatively connected to be put into operation upon the occurrence of a shadow in said curtain of radiation.

2. A photoelectric detecting apparatus comprising the combination of a linear light source arranged to circumferentially illuminate an area, a rotatable mirror located adjacent the circumference of said area and having reflecting surfaces linearly scanning said light source during rotation of said mirror, a photoelectric device positioned to receive light reflected by said mirror during rotation, and an electro-responsive mechanism electrically connected to said photoelectric device for carrying out a predetermined operation upon the occurrence of a shadow in the reflected light.

3. Apparatus for detecting the presence of an object projecting into a doorway comprising the combination of a linearly extended light source positioned at a portion of the periphery of said doorway to project light across said doorway, a rotating truncated pyramidal mirror positioned to successively scan portions of said source, a photoelectric device positioned to receive light reflected by said rotating mirror and being sensitive to light variations due to the shadowing of said source by objects in said doorway and electro-responsive means connected to said photoelectric device for carrying out a desired operation upon the occurrence of such shadow.

4. Apparatus for detecting the presence of an object projecting into a doorway comprising a linear light source at a portion of the periphery of said doorway, a photoelectric device, a rotatable mirror opposite said portion having angularly disposed reflecting surfaces whereby light is reflected successively from different parts of said source into said photoelectric device and electrical apparatus connected to operate in response to the occurrence of shadows in the light received by said mirror.

5. A scanning apparatus comprising the combination of a linearly extended light source which is marginally located adjacent an area to be scanned, a photoelectric device which is spaced away from said source in position to receive light therefrom and is responsive to radiations received therefrom, means located adjacent said area but remote from said source for uninterruptedly linearly scanning said light source and reflecting the scanning light upon said photoelectric device whereby shadows caused by objects in the path of said beams will vary the current output thereof, and actuating means electrically connected to said photoelectric device and being responsive to such change to effect a desired operation.

EARLE B. McDOWELL.
EDWARD M. GARDINER.

REFERENCES CITED

The following references are of record in the file of this patent:

UNITED STATES PATENTS

| Number | Name | Date |
|---|---|---|
| 2,378,744 | Annen | June 19, 1945 |
| 1,966,243 | Hanna et al. | July 10, 1934 |
| 1,819,439 | Peterson | Aug. 18, 1931 |

FOREIGN PATENTS

| Number | Country | Date |
|---|---|---|
| 791,363 | French | Sept. 23, 1935 |